United States Patent [19]

Yamazaki

[11] 4,105,731

[45] Aug. 8, 1978

[54] METHOD OF EMBEDDING AN END OF A BUNDLE OF THREAD-LIKE BODIES IN A MOLDING MATERIAL AND CONTROLLING CAPILLARY ACTION BY SAID MATERIAL

[75] Inventor: Masahiro Yamazaki, Kamakura, Japan

[73] Assignee: Nippon Zeon Co., Ltd., Tokyo, Japan

[21] Appl. No.: 812,166

[22] Filed: Jul. 1, 1977

Related U.S. Application Data

[62] Division of Ser. No. 679,988, Apr. 26, 1976, Pat. No. 4,049,765.

[30] Foreign Application Priority Data

May 2, 1975 [JP] Japan .................................. 50-53614

[51] Int. Cl.² ........................... B29C 5/00; B29D 3/00
[52] U.S. Cl. ....................................... 264/94; 156/289; 156/296; 156/305; 264/138; 264/163; 264/261; 264/263; 264/264; 264/267; 264/279; 264/299; 264/DIG. 75

[58] Field of Search ............... 264/263, 264, 130, 134, 264/264, 261, 263, 271, 279, 299, 265, 298, 213, 215; 156/289, 296, 305

[56] References Cited

U.S. PATENT DOCUMENTS

| 3,064,345 | 11/1962 | Herman et al. ...................... 264/298 |
| 3,442,002 | 5/1969 | Geary et al. ......................... 264/298 |
| 3,671,622 | 6/1972 | Humphries ........................... 264/263 |
| 3,730,959 | 5/1973 | Horres et al. ........................ 264/265 |
| 3,884,815 | 5/1975 | Vogt et al. ........................... 264/271 |
| 3,932,570 | 1/1976 | Cox et al. .............................. 264/88 |

*Primary Examiner*—Willard E. Hoag
*Attorney, Agent, or Firm*—McDougall, Hersh & Scott

[57] ABSTRACT

An end portion of a bundle of thread-like bodies to be set is dipped into a solidifiable liquid. At least a part of said bundle, adjacent to the predetermined level of the solidifiable liquid, is contacted with a specific liquid or gas which substantially prevents wicking of said solidifiable liquid along said thread-like bodies due to capillary action. The solidifiable liquid is not drawn up through the bundle beyond predetermined level of the solidifiable liquid, and solidified at the predetermined level.

10 Claims, 16 Drawing Figures

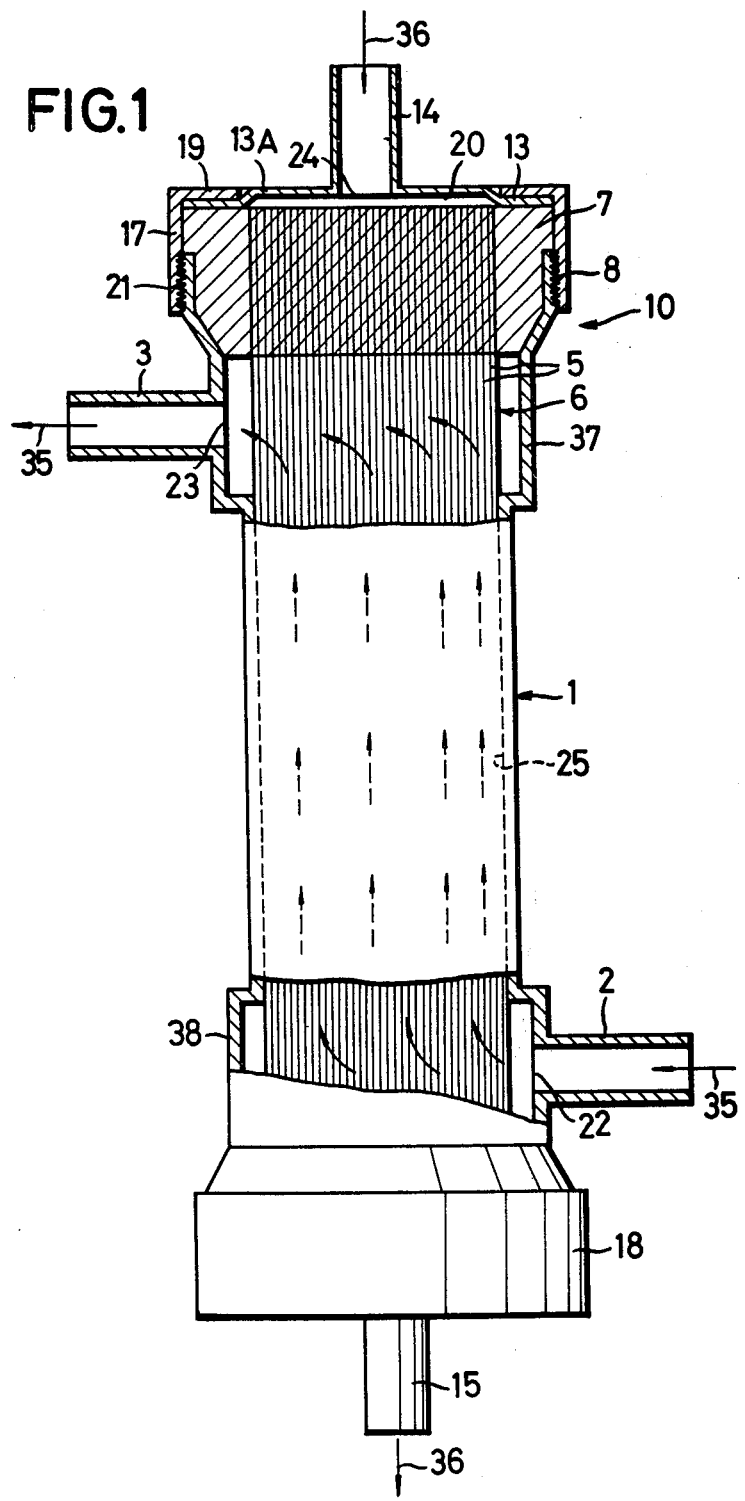

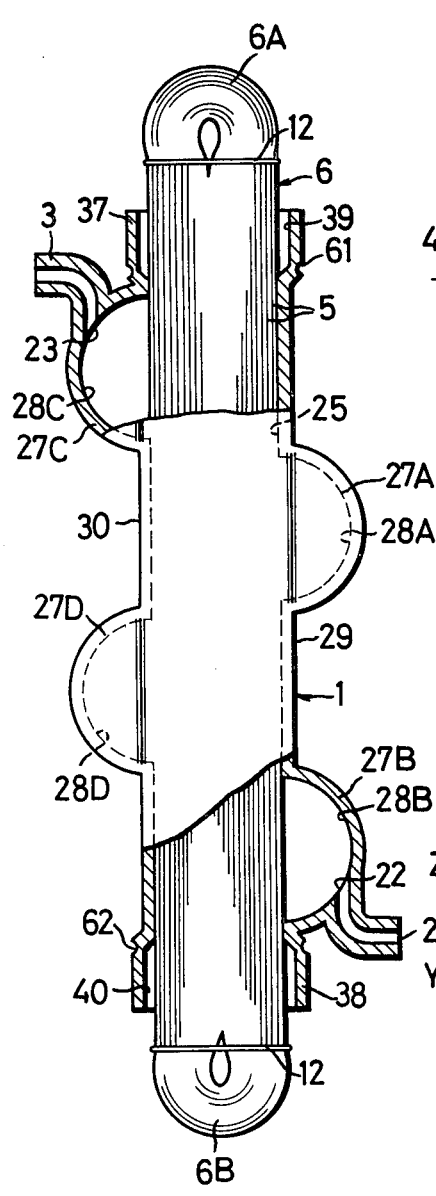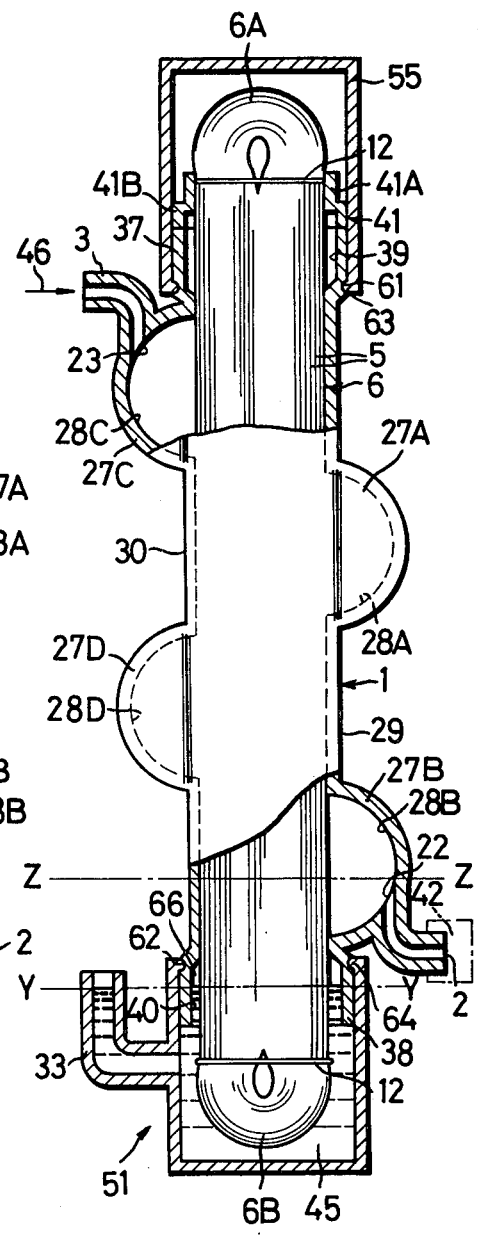

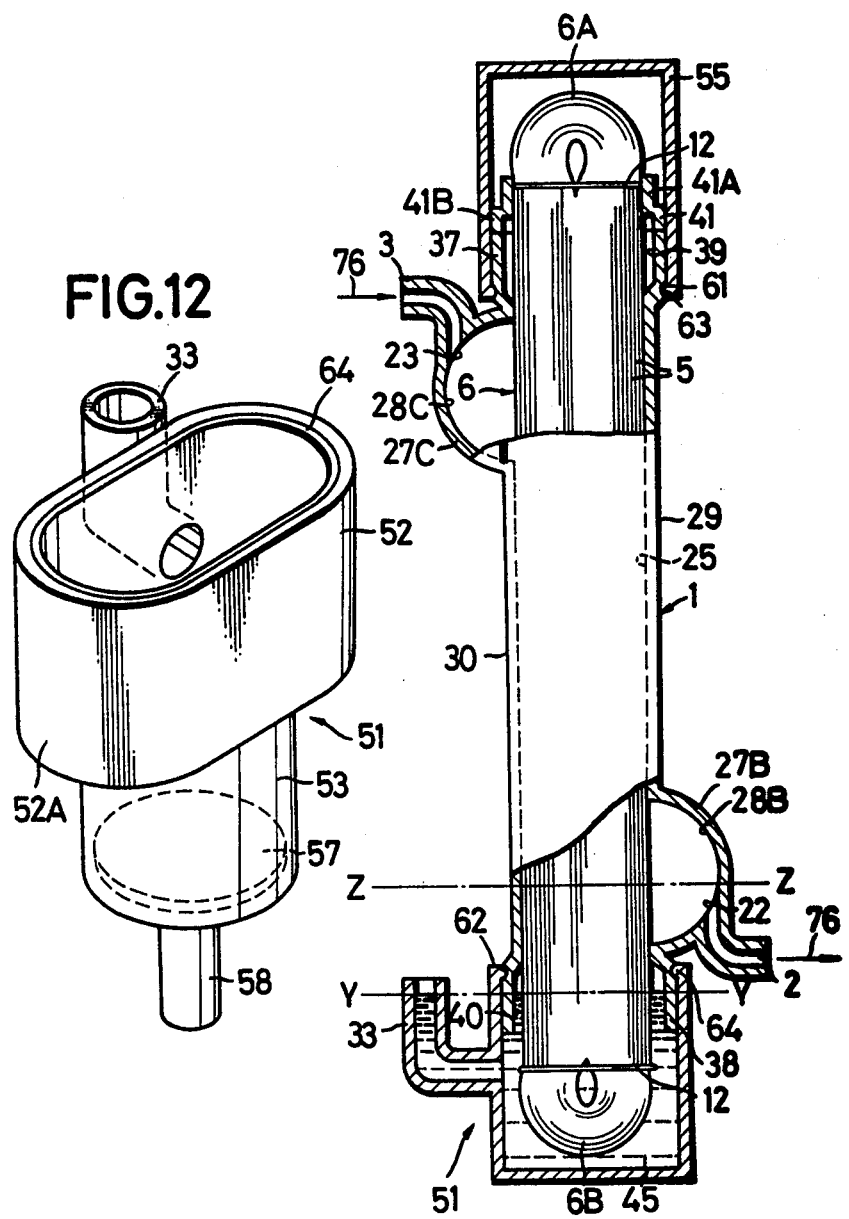

METHOD OF EMBEDDING AN END OF A BUNDLE OF THREAD-LIKE BODIES IN A MOLDING MATERIAL AND CONTROLLING CAPILLARY ACTION BY SAID MATERIAL

This is a division of application Ser. No. 679,988, filed Apr. 26, 1976, now U.S. Pat. No. 4,049,765.

BACKGROUND OF THE INVENTION

1. Field of the Invention

This invention relates to a method for setting an end portion of a bundle of thread-like bodies, and more particularly to a method for setting an end portion of a bundle of solid thread-like bodies or hollow thread-like bodies made of any polymeric material which is suitable for selective or differential permeation fluid separations, such as blood dialysis, with a solidifiable liquid in a casing assembly.

2. Description of the Prior Art

A hollow-fibre permeability apparatus has been used for blood dialysis, by which toxic materials can be removed from the blood of a patient suffering from renal failure or intoxication. Such an apparatus is also used as an artificial lung, in which oxygen and carbon dioxide are exchanged through hollow-fiber membranes to serve as an artificial lung.

An example of a conventional hollow-fibre permeability apparatus will now be described.

FIG. 1 shows a hollow-fibre blood dialysis apparatus 10 currently used as an artificial kidney. The apparatus 10 comprises a cylindrical casing assembly 1 made of synthetic resin. The casing assembly 1 is open at both ends. Upper and lower cylindrical enlarged-diameter portions 37 and 38 are formed integrally with the casing assembly 1. An inlet tube 2 and an outlet tube 3 for introducing a dialysate are connected to the enlarged portions 38 and 37, respectively, which are positioned diametrically opposite to each other. Screw threads 8 are formed on the outer cylindrical surfaces of the end portion of the enlarged portion 37 and of the end portion of the enlarged portion 38.

A permeating region 25 in the casing assembly 1 is occupied with a hollow-fibre bundle 6 which consists of numerous hollow fibres 5 packed tightly to each other. The hollow fibres 5 are made of any polymeric material, such as cellulose, and are substantially of the same length as the casing assembly 1. Usually, the bundle 6 consists of ten to fifteen thousand hollow fibres 5, which are about 0.3 mm in diameter. The total effective membrane area of the hollow fibres 5 for dialysis is about 1 m$^2$.

Each end portions of the cylindrical casing assembly 1 is closed by a fluid-tight case wall member (potting material) 7 preferably formed of polymeric composition such as polyurethane, silicone resin or epoxy resin. The hollow fibers 5, substantially parallel to each other and to the axis of the cylindrical casing assembly 1, extend between the potting materials 7. The hollow fibers 5 have open end portions which are embedded in and extend through the cast wall member (potting material) in fluid-tight relation thereto. Upper and lower disc covers 13 contact the outer peripheral regions of the upper and lower surfaces of the potting material 7. Fastening rings 17 and 18 are secured to the casing assembly 1 by the engagement of screw threads 21 with the screw threads 8. Thus, the potting material 7 and the disc covers 13 are tightly fixed between both ends of the casing assembly 1 and inwardly directed flange portions 19 of the fastening rings 17 and 18. In this way, the bundle 6 of hollow fibres 5 is fixed at both ends in the casing assembly 1. The openings of the hollow fibres 5 on the smooth surfaces of the potting material 7 are made by cutting the cast wall member along the predetermined lines.

The disc covers 13 at the both ends of the casing assembly have blood inlet 14 and outlet tube 15, respectively. The disc covers 13 forms circular compartments 20 adjacent to and communicating with the inlet or outlet tubes 14 or 15, and also communicating with the interiors of the hollow fibres 5.

In the case of blood dialysis, dialysate 35 is supplied into the housing 1 from the inlet tube 2, and blood 36, from an artery of a patient, is introduced into the housing 1 through the inlet tube 14. The dialysate 35 is distributed in an annular space 22 defined by the enlarged portion 38, and then passes into the bundle 6 of hollow fibres 5. The dialysate 35 passes upwardly along through the bundle 6, and comes out of the housing 1 through the outlet tube 3 via an annular space 23 defined by the enlarged portion 37 and out of the housing 1 through outlet tube 3. The blood 36 is distributed into the upper openings of the hollow fibres 5 in the upper compartment 20. The blood 36 flows downward counter-currently with the dialysate through the interiors of the hollow fibres 5, and is led out of the housing 1 through the lower openings of the hollow fibres 5, the lower compartment 20 and the outlet tube 15.

The blood of a renal failure patient, containing metabolic wastes such as urea, uric acid and creatinine can be removed from the blood 36 into the dialysate 35 through permeable membranes of the hollow fibres. The purified blood 36 returns to a vein of the patient. When the dialysate side is negative in pressure compared with the blood side, ultra-filtration is effected through the hollow fiber membrane, thus excess water can be removed from the blood 36 of the patient. The apparatus 10 can be smaller than conventional coil-type or plate-type (Kiil-type) apparatus, because the hollow fibres 5 provide a relatively large effective membrane area for its size. Thus, the blood priming volume can be reduced, being beneficial to patients during their dialysis therapy. The hollow fiber type is also easier to handle, and is superior for ultrafiltration.

In the assemblage of the blood dialysis apparatus 10, the end portions of the bundle 6 consisting of numerous hollow fibers 5 should be potted in the cylindrical case assembly 1. Conventional operations for potting the bundle 6 in the case assembly 1 are very troublesome.

In one example of the conventional operations, the hollow fiber bundle 6 is first placed in the case assembly 1 which is about 30 cm long. The bundle 6 is protruded by about 3 to 5 cm from both the ends of the case assembly 1. Next, one of the protrusions of the bundle 6 is dipped into a solidifiable liquid in a molding cavity. The solidifiable liquid is, for example, silicone resin composition, epoxy resin composition or urethane resin composition. When the protrusion of the bundle 6 is dipped into the solidifiable liquid, the wicking usually occurs between and along the hollow fibers, due to capillar action. The wicking takes place usually about 3 to 5 cm above the predetermined level of the solidifiable liquid. The solidifiable liquid rises much higher at the central portion than in the peripheral portion of the bundle.

Many studies have been made to prevent the wicking of the solidifiable liquid in the container. However, there has been no useful way except a centrifugal method which is effective in achieving a uniform fluid-tight wall and seal between those hollow fibers and the casing assembly, without wicking.

The following is a discussion on the capillary action in view of preventing the wicking phenomenon.

It is considered that the capillary action is closely correlated with "wetting". We have a relationship with respect to a wetting work Wi, a surface tension γs of solid material (ie. the capillary tube), and an interfacial tension γi between the liquid and the solid material, as follows:

$$Wi = \gamma s - \gamma i \quad (1)$$

Further, the relationship between a surface tension Γl of the liquid, the surface tension γs of the solid material and the interfacial tension γi is represented by the following formula:

$$\gamma s = \gamma i + \gamma_l \cdot \cos\theta \quad (2)$$

, where $\theta$ represents contact angle between the solid material (ie. the capillary tube) and the liquid. The formula (2) is called "Young's relationship". From the above formulas (1) and (2); we have $$Wi = \gamma l \cdot \cos\theta \quad (3)$$

From the formula (3), it is inferred that the wetting work Wi which relates to the wicking depends on the contact angle O, in other words, depends on the wettability.

SUMMARY OF THE INVENTION

An object of this invention is to provide a useful method for setting an end portion of a bundle of thread-like bodies without an undesirable wicking of a solidifiable liquid between and along the thread-like bodies which would, by coating the surfaces of the thread-like bodies, reduce the effective membrane area within the casing assembly for permeation and separation.

Another object of this invention is to provide a method for setting an end portion of a bundle of thread-like bodies with a solidifiable liquid which forms a void-free, pin-hole-free and fluid-tight cast wall member surrounding the thread-like bodies.

A further object of this invention is to provide a method for setting an end portion of a bundle of thread-like bodies with a solidifiable liquid which solidifies to form a cast wall member fluid-tightly surrounding the thread-like bodies and being fixed to a casing assembly.

In accordance with an aspect of this invention, a method for setting an end portion of a bundle includes following steps: (1) dipping an end portion of a bundle of thread-like bodies into a solidifiable liquid; and (2) contacting at least a part of the bundle, adjacent to the predetermined level of the solidifiable liquid, with a second liquid having more wettable nature to the surface of the thread-like bodies than the solidifiable liquid or with a polar gas of the least one kind selected from the group consisting of an ammonia gas, a primary amine gas and a secondary amine gas.

The above and other objects, features and advantages of this invention will become apparent from the following detailed description of illustrative embodiments shown in the accompanying drawings.

BRIEF DESCRIPTION OF THE DRAWINGS

FIG. 1 is a partly broken away front view of a conventional blood dialysis apparatus for an artificial kidney;

FIGS. 3 and 4 are partly broken away front views illustrating the sequential steps for setting end portions of the bundle in a casing assembly used for an artificial kidney, according to a first embodiment of this invention;

FIG. 12 is a perspective view of a molding cavity shown in FIG. 11;

FIG. 14 is a partly broken away front view illustrating one of the sequential steps for setting end portions of the bundle in a casing assembly for an artificial kidney, according to a sixth embodiment of this invention.

DESCRIPTION OF THE PREFERRED EMBODIMENTS

Figure 2A:
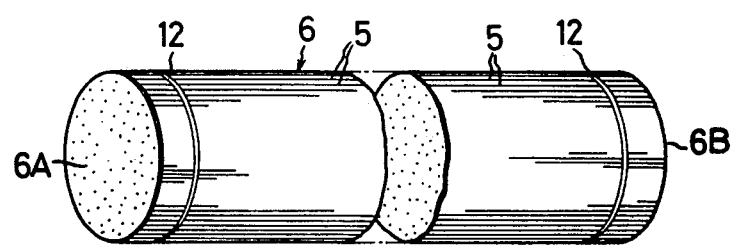
FIGS. 2A to 2C are perspective views of differnt kinds of bundles of hollow fibers applicable to embodiments of this invention.

The first embodiment of this invention, applied to an artificial kidney assemblage, will be described with reference to FIGS. 2 to 8. Parts in embodiments which correspond to the parts in the conventional artificial kidney apparatus shown on FIG. 1, are denoted by the same reference numerals, which will not be described in detail hereafter.

Figure 2B:
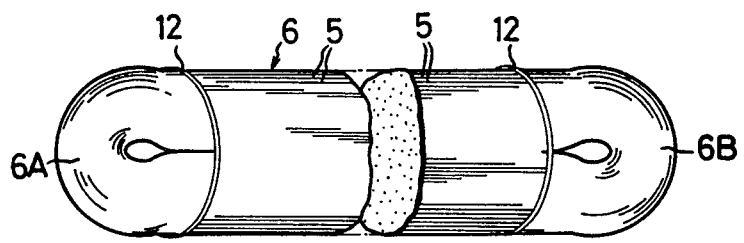
Figure 2C:
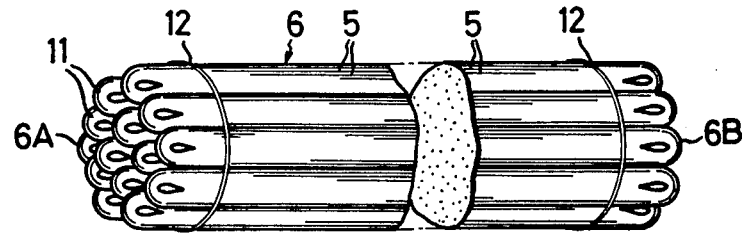

FIGS. 2A to 2C show different types of bundles of hollow-fibers. Each of the bundles 6 usually consists of 10 thousands to 15 thousands of the hollow fibers 5 which are made, for example, of cellulose, acrylic resin, polyacrylonitrile or polysulfone acid, and are about 0.3 mm in outer diameter.

Figure 10:
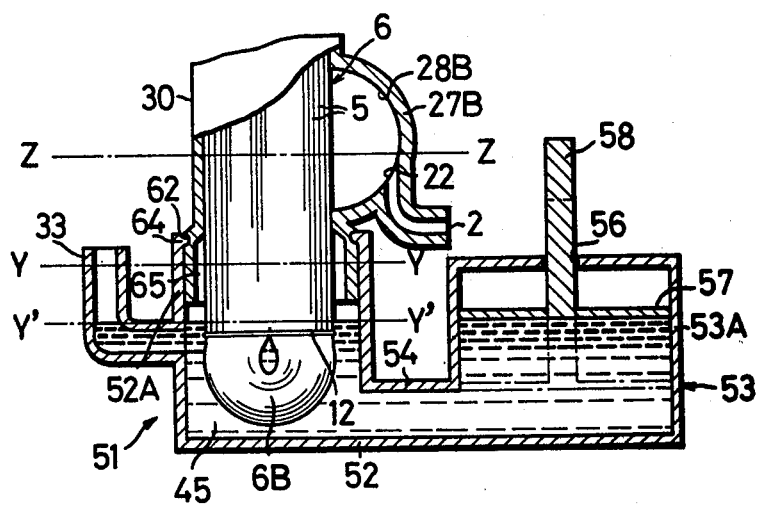
FIG. 10 is a partly broken away front view illustrating one of the sequential steps for setting end portions of the bundle in a casing assembly used for an artificial kidney, according to a third embodiment of this invention.

In the bundle 6 of FIG. 2A, 10 thousands to 15 thousands of the hollow fibers 5 which are cut to a uniform length are bundled with a rubber band or a normal thread 12 at their end portions at about 10 mm from their ends.

FIG. 2B shows a hank consisting of about 10 thousands to 15 thousands of the hollow fibers 5 on its cross-section, similarly bundled at the end portions.

FIG. 2C shows a plurality of hanks 11 of hollow fibers 5 similarly bundled at the end portions.

The bundle 5 may be bundled with a slotted elastic ring, or may be provisionally set with a suitable adhesive.

In the first embodiment of this invention, the bundle 6 shown on FIG. 2B is positioned in the casing assembly 1, as shown on FIG. 3. The casing assembly 1 can be made of any kind of synthetic polymer or copolymer such as polyethylene, polypropylene, polystyrene, polyvinyl chloride, acrylic resin, acrylonitrile-styrene copolymer, or an etylene-propylene copolymer. The casing assembly 1 may be made of metal or glass. The casing assembly 1 in this embodiment has an oblong cross-section whose short sides are semicircular. Upper and lower oblong enlarged diameter walls 37 and 38 are formed integrally with the casing assembly 1 to make enlarged regions 39 and 40. The inner walls of the casing assembly 1 on opposite sides 29 and 30 are formed to have enlarged cross-section portions 27A to 27D by a plurality of interconnecting flat planes and semicylindrically curved surfaces. The surface configuration of the wall on one side of the bundle is a mirror image of the surface configuration of the wall on the other side of the bundle with one of the walls being displaced longitudinally relative to each other.

As shown in FIG. 3, the enlarged cross-section regions 28A to 28D defined by the curved surfaces communicate with a permeating region 25 where the hollow fibre bundle 6 is placed. An inlet tube 2 and an outlet tube 3 for dialysate are connected to the enlarged cross-section portions 27B to 27C, respectively.

The casing assembly 1 is about 30 cm long. The bundle 6 is about 38 cm long. The upper and lower end portions 6A and 6B of the bundle 6 are protruded from both ends of the casing assembly 1 by about 4 cm which is represented by $h_1$ in FIG. 5. Generally, the length $h_1$ may be about 2.0 cm to 6.0 cm.

The bundle 6 is placed in the casing assembly 1, so as to occupy the permeating region 25 which has an oblong cross-section. But the enlarged cross-section regions 28A to 28D are not occupied with the bundle 6.

The area of the cross-section of the permeating region 25 is usually 15 cm$^2$ to 30 cm$^2$ for an artificial kidney. The ratio of the volume of the packed hollow fibers 5 to the volume of the permeating region 25, namely the density of packing of the hollow fibers 5 in the permeating region 25 may, for practical purpose, be of any convenient value, usually be about 20 to 50%, for example, it is about 35%.

Next, as shown in FIG. 4, the end portions 6A and 6B of the bundle 6 are covered with a cap 55 and a molding cavity 51, respectively. Annular grooves 61 and 62 are formed in the outer circumferential surfaces ot both end portions of the casing assembly 1. An annular projection 63 is formed on the end portion of the cap 55. By pushing the cap 55 onto the end portion of the casing assembly 1, the annular projection 63 of the cap 55 clicks into the annular groove 61 of the case assembly 1, as shown in FIG. 4. The molding cavity 51 has nearly the same shape as the cap 55, but with an L-shaped inlet tube 33. An annular projection 64 is formed on the end portion of the molding cavity 51. By pushing the molding cavity 51 onto the end portion of the casing assembly 1, assembling is easily performed. During the assemblage, it is preferable to keep the bundle 6 in the right position in the casing assembly in order to prevent the bundle from displacing downwardly. A holding ring 41 at the upper end portion of the bundle, which is made of suitable material, is used to keep the bundle in the right position in the casing assembly. The holding ring 41 consists of a larger ring portion 41B and a smaller ring portion 41A. The latter prevents the bundle from slipping down. The diameter of the larger ring 41B is nearly equal to the diameter of the upper end wall 37 of the casing assembly 1 to rest on it.

The upper end 6A of the bundle 6 may be covered with another molding cavity which is similar to the molding cavity 51, instead of the cap 55. The upper end portion of the bundle can be potted in the casing assembly in the similar manner to the lower end portion.

A solidifiable liquid 45 is introduced into the molding cavity 51 through the inlet tube 33 after the cylindrical portion 51A of the molding cavity 51 is assembled to the casing assembly 1. The molding cavity 51 may previously contain the solidifiable liquid 45.

The solidifiable liquid is, for example, silicone resin composition, epoxy resin composition or urethane resin composition. In this embodiment, deaerated urethane resin composition comprising prepolymer and a curing agent is used as the solidifiable liquid. Such liquid becomes non-fluid in a short time, for example, in 15 minutes. The viscosity of the solidifiable liquid is about 5000 cps.

The molding cavity 51 and the cap 55 are formed of synthetic resin such as polyethylene, polypropylene, poly-styrene or acrylic resin. It may be formed of metal or glass. The holding ring 41 may be formed of elastic synthetic resin. It is preferable to coat the inside surface of the molding cavity 51 with a parting agent such as silicone.

Figure 5:
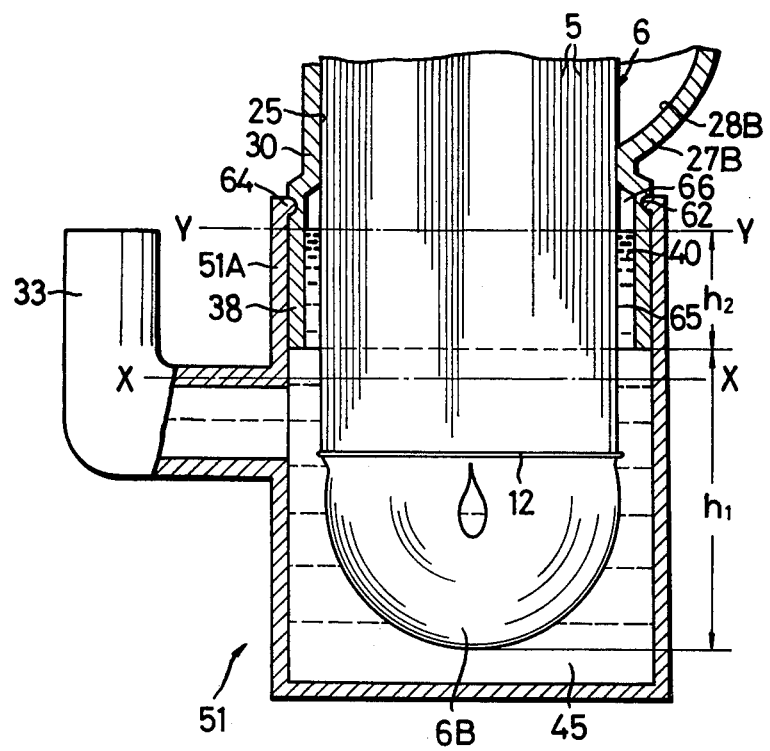
FIG. 5 is an enlarged cross-sectional view of an important part of FIG. 4.
Figure 6:
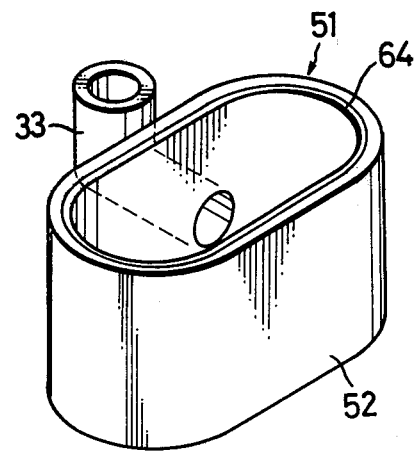
FIG. 6 is an enlarged perspective view of a molding cavity shown in FIG. 4.

As shown in FIGS. 4 and 5, the lower end portion 6B of the bundle 6 is dipped into the solidifiable liquid 45. The lower end of the bundle 6 is positioned about 6.0cm below the level of the solidifiable liquid 45 in the molding cavity 51. Accordingly, the level of the solidifiable liquid 45 is positioned about 2.0 cm above the lower end of the casing assembly 1. The height (2.0cm) from the lower end of the casing assembly 1 to the level of the solidifiable liquid 45 is represented by a reference letter $h_2$ in FIG. 5. At the same time or immediately after the bundle 6 is dipped into the solidifiable liquid 45, a second liquid according to this invention is supplied into the casing assembly 1. The second liquid 46 is slowly supplied through the outlet tube 3 for dialysate into a charging region 66 for the second liquid with a rubber cap 42 on the inlet tube 2. The amount of the second liquid 46 supplied may be up to the level Z — Z in FIG. 4. The second liquid 46 may be supplied into the casing assembly 1 at the same time when the solidifiable liquid 45 is introduced into the molding cavity 51. The boundary surface formed between the solidifiable liquid and the second liquid rises gradually with the continuous introduction of the solidifiable liquid 45. Both the solidifiable liquid and the second liquid are slowly supplied into the molding cavity 51 and the housing 1, so that both the liquids may not be mixed with each other.

The interfacial surface is finally positioned at the level Y — Y (FIG. 4), by pushing the solidifiable liquid. The second liquid is drawn up through the bundle 6 above the level Z — Z, due to capillarity or capillary action. However, the drawn-up second liquid has no bad influence on the bundle, because the second liquid is a kind of easily washed out and easily removed material.

Since the second liquid has higher wettability, the surfaces of the hollow fibers within the charging region 66 are wetted preferentially with the second liquid. Accordingly, the setting liquid 45 can be substantially prevented from rising up above the level Y — Y along through the bundle due to capillarity.

According to this invention, the principle of the preferential wetting by the second liquid which has higher wettability is employed in view of the basic consideration of capillarity. Thus, the disadvantages of the conventional assembling methods can be effectively removed.

The solidifiable liquid 45 is solidified in such a condition that the lower end portion 6B of the bundle 6 is dipped into the solidifiable liquid 45 in contact with the second liquid.

For the selection of the second liquid, the "Draves test" is adopted.

In the "Draves test," a small piece of specimen (small piece of hollow fiber taken from the bundle) is carefully placed on the surface of a liquid for test, and the time $t$ when it begins to sink, or the time $t$ when the total surface of the specimen is wetted by the liquid, is measured. The relationship between the time $t$ and the contact angle $\theta$ which represents a wettability, is represented by the following formula:

$$\log t = A + \cdot \cos\theta \qquad (4)$$

, where A and B are constants.

For this relationship, reference is made to "Wetting and its related matters" — Chapter III, Surface Chemistry, Experimental Chemistry Course No.7, published by Maruzen Co., Ltd. and "Journal of Physical Chemistry" vol. 57, Page 98, 1953. From the formula (4), it is judged that the longer the time $t$, the poorer the wettability. Accordingly, it is possible to select a second liquid which is superior in wettability to the solidifiable liquid. The results of the Draves test on different liquids are shown in Table 1.

All of the selected liquids which has higher wettability to the surfaces of the thread-like bodies than the solidifiable liquid, can be in principle used as the second liquid 46 according to this invention. However, it is preferable that the second liquid be insoluble or hard to dissolve into the solidifiable liquid. When this invention is applied to an assembling of a blood dialysis apparatus as an artificial kidney, it is required that the second liquid be nontoxic or be easily removed by washing.

| Kind of liquid | | Time |
| --- | --- | --- |
| Polyurethane prepolymer | (Component of solidifiable liquid) | 24 min. |
| Polyurethane curing agent | " | 1min.and 30sec. |
| Water | (second liquid) | 4.5sec. |
| Ethanol | " | 0sec. |
| n-Hexan | " | 0sec. |
| Dioxane | " | 1.0sec. |
| Ethyl Acetate | " | 0sec. |
| Tetrahydrofuran | " | 0sec. |
| Decaline | " | 1.0sec. |
| iso-Ocatane | " | 0sec. |
| Dimethylsulfoxide | " | 1.0sec. |
| Dimethylformamide | " | 0sec. |
| glycerin | " | 1min.and 30sec. |
| Petroleum benzine | " | 0sec. |
| Monochloro benzene | " | 3.0sec. |

The time differs depending on the shape and size of the specimen. The test was made in the same condition for comparison of their wettabilities. Specimens: Bundle of onehundred and fity cellulose hollow fibers of 50mn length.Tightness of bundle was almost the same.

For example, the following materials fulfil the above-described requirements:

When a urethane resin used as the solidifiable liquid 45, water, origanic solvents miscible with water such as methanol, ethanol acetic acid, aceton, and their aqueous solutions, aqueous solutions of inorganic materials such as calcium chloride, sodium chloride and potassium chloride, dioxane, ethylene glycol, glycerine, and dioctyl-phthalate fulfil the above requirements.

For a silicone resin as the solidifiable liquid 45, examples of the second liquid are water, the above described organic and inorganic aqueous solutions, ethylene glycol, glycerine, cyclohexanol, isopropanol, vegetable oil, animal oil and fatty acid (Carbon number 1 - 22).

And for epoxy resin as the solidifiable liquid 45, water, the above-described organic and inorganic aqueous solutions, etylene glycol, glycerine and aliphatic hydrocarbon, such as n-hexane, cyclohexane, heptane, and octane are available as a second liquid.

Glycerine which acts as a plasticizer is usually added into the material of the hollow fibers used for a blood dialysis in order to maintain their permeability after being dried. Thus, preferably addition of a small amount of glycerine into the second liquid will serve to compensate for loss of glycerine due to extraction from the material of the hollow fibers and to prevent the deterioration of the permeability of the hollow fibers. For example, plasticizer is added into water as the second liquid, or into saturated or almost saturated aqueous inorganic salt solution, such as aqueous sodium chloride solution. Moreover, surface active agents may be added into the second liquid to promote the wettability of the second liquid.

By specific combinations of the second liquid 46 and the solidifiable liquid 45, an interfacial layer of network structure can be formed between the two liquids. For example, when water or glycol is used as the second liquid 46, and poly-urethane composition is used as the solidifiable liquid, the hydroxyl groups of the former react with the isocyanate group of the latter to form the interfacial layer of network structure. It is considered that such interfacial layer can more effectively prevent the solidifiable liquid from wicking along through the bundle.

When the inlet tube 2 for dialysate is closed with the rubber cap 42, and a compressed gas such as a compressed air or compressed nitrogen gas is introduced into the permeating region 25 through the outlet tube 3 for dialysate, the solidifiable liquid 45 can more uniformly penetrate into the bundle 6 within the dipping region 65. The gauge pressure of the compressed gas is decided depending on the viscosity of the solidifiable liquid 45, preferably, one or more atmospheric pressure. However, less than 3 kg/cm$^2$ is satisfactory. The compressed gas continues to be applied until the solidifiable liquid uniformly penetrates into the bundle in the dipping region 65. It may continue to be applied until the solidifiable liquid is solidified.

With the introduction of the compressed gas into the housing 1, the traces of air still remaining in the solidifiable liquid are compressed to become minimum in size, enough to make the cast wall member to be fluid-tight.

Figure 8:
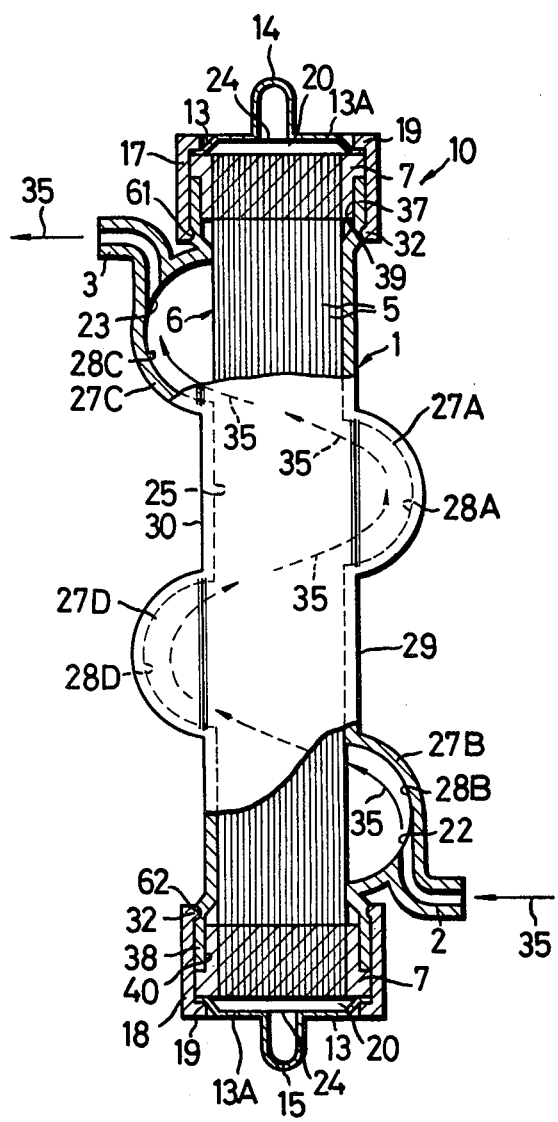
FIG. 8 is a partly broken away side view of FIG. 7.

Since the wicking can be effectively prevented according to this invention, less-viscous solidifiable liquid, which usually develops higher wicking, can be used. As the result, it can more uniformly penetrate into the bundle 6 to surround each the thread-like bodies within the dipping region 65. Thus, pin holes can be effectively prevented, to form the fluid-tight cast wall member. After solidification, the lower cast wall member which contains the end portion 6B of the bundle 6 is cut off flatwise at a suitable position by a cutting means such as a rotary cutter. Suitable hardness of the cast wall member (potting material) 7 on cutting is normally 20 – 80 in Shore hardness A. The cutting may be made after the molding cavity 51 is taken off from the casing assembly 1. Or it may be cut off together with the molding cavity 51. In this case, the remnant of the portion 51A of the molding cavity 51 is taken off from the casing assembly 1 after cutting. It is preferable that the cast wall member is cut off at the position above the binding thread 12. The cut position had better be apart from the binding thread 12, enough to be free from deformation caused by the binding. Such level (the cut position) is shown by the line X — X in FIG. 5. This opens the ends of the hollow fibers embedded in and extending through the remaining portion of the cast wall member. As shown in FIG. 8, the lower disc cover 13 of oblong cross-section is applied to the outer peripheral regions of the lower cut surface of the potting material portion 7, and then the annular projection 32 of the fastening ring 18 clicks into the annular groove 62 of the casing assembly 1. Thus, the potting material 7 and the lower disc cover 13 are assembled between the lower end of the housing 1 and the inwardly directed flange portion 19 of the fastening ring 18.

The upper end portion 6A of the bundle 6 is processed in the same manner as the lower end portion 6B, after the cap 55 and the holding ring 41 are demounted and replaced by the molding cavity.

Although the cross-section of the housing 1 is oblong in the above-described embodiment, the invention may be applied to a cylindrical housing which is used in the conventional blood dialysis apparatus shown in FIG. 1. In such a case, the molding cavity 51 and the cap 55 are cylindrical. Instead of the annular grooves and the annular projections, screw threads may be formed in the inner surfaces of the molding cavity 51 and the cap 55, and in the outer surfaces of the upper and lower end portions of the housing 1 for fixing the molding cavity 51 and the cap 55 to the casing assembly 1.

Figure 7:
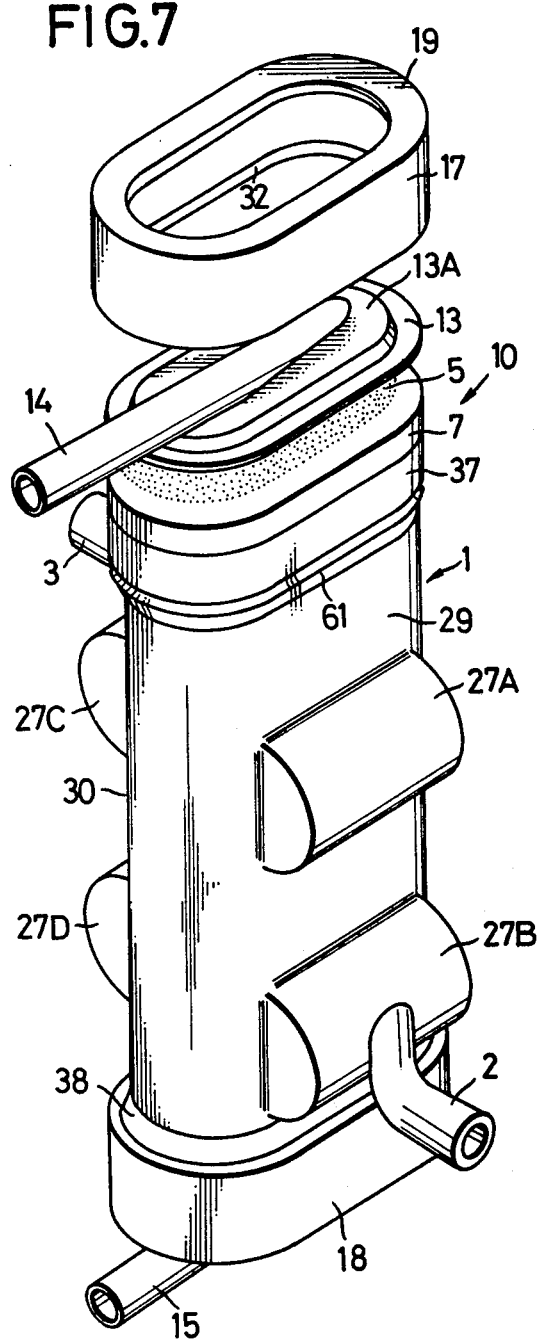
FIG. 7 is a perspective view of an artificial kidney to which this invention is applied, partly exploded.

The artificial kidney apparatus shown in FIGS. 7 and 8 is quite a new type in which incoming dialysate flow 35 deflects along the curved sidewalls 27A to 27D to travel back and forth through the fundle 6 so as to utilize the total membrane area of the hollow fibers in contrast to the conventional type in which dialysate cannot penetrate into the center of the bundle. The principle of cross-flow through the bundle does effect the washing of the second liquid.

Next, a second embodiment of this invention will be described with reference to FIG. 9, which will be applied to an artificial kidney apparatus.

This embodiment is different from the first embodiment only in a manner of holding the upper end portion 6A of the bundle 6. Parts in FIG. 9 which correspond to the parts in FIGS. 3 and 4, are denoted by the same reference numerals, which will not be described hereafter.

Figure 9:
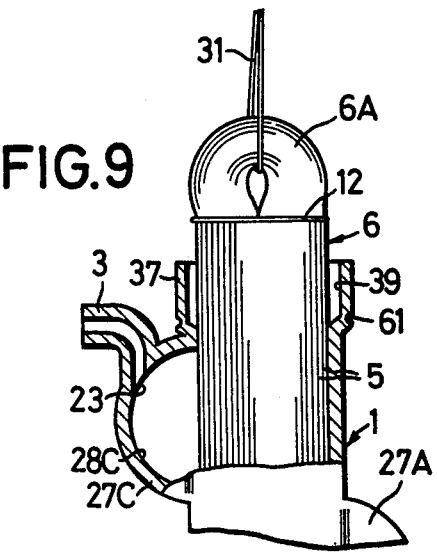
FIG. 9 is a partly broken away front view illustrating one of the sequential steps for setting end portions of the bundle in a casing assembly used for an artificial kidney, according to a second embodiment of this invention.

In FIG. 9, the hank of hollow fibers 5 or the bundle 6 is suspended by a thread 31. An upper end of the thread 31 is fixed to a stationary member (not shown). The bundle 6 is vertically held in the casing assembly 1, in the desirable manner.

Next, a third embodiment of this invention will be described with reference to FIG. 10, which will be applied to an artificial kidney apparatus. This embodiment is different from the first embodiment only in construction of the molding cavity 51.

In this embodiment, a molding cavity 51 includes a first cavity 52 having an oblong-shaped cylindrical wall 52A and an L-shaped inlet tube 33, a second cavity 53 having a cylindrical wall 53A, and a tube member 54 by which the first and second cavities 52 and 53 are connected to each other. An opening 56 is made in the upper wall of the second cavity 53. A piston rod 58 is inserted through the opening 56 so as to be movable in the vertical direction. A piston disc 57 is fixed to one end of the piston rod 58. An inwardly directed projection 64 is formed on the upper edge of the first cavity 52. The projection 64 of the first cavity 52 clicks into the circumferential groove 62 of the lower end portion of the casing assembly 1.

In this embodiment, the first and second cavities 52 and 53, and the tube member 54 are formed integrally with each other. However, they may be separately formed, and then the first and second cavities 52 and 53 may be combined with each other through the tube member 54. In such a case, the second cavity 53 can be repeatedly used, as occasion demands.

Initially, the piston disc 57 is held in its original position shown by the solid line in FIG. 10. The solidifiable liquid 45 is supplied into the molding cavity 51 through the inlet tube 33, so that the level of the liquid 45 in the molding cavity 51 is positioned at the Y' — Y' line in FIG. 10. Next, the piston rod 58 is moved downward by a hydraulic or pneumatic cylinder (not shown), or a suitable mechanical drive means. The piston disc 57 presses down the level of the solidifiable liquid in the second cavity 53, to a lower position shown by the dot-dash line in FIG. 10, while the level of the solidifiable liquid in the first cavity for molding 52 is moved upwardly from the Y' — Y' line to the Y — Y line. The second liquid is introduced into the lower part of the casing assembly 1 in the same manner as in the first embodiment. The succeeding operations are the same as in the first embodiment. Accordingly, they will not be described here.

In the third embodiment, the level of the solidifiable liquid 45 in the first cavity 52 is gradually moved upwardly with pressing of the piston disc 57 in order to expell air upward effectively from the dipping region 65.

Figure 11:
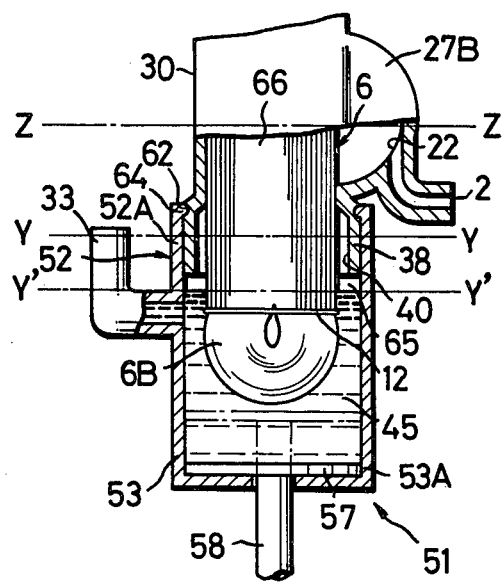
FIG. 11 is a partly broken away front view illustrating one of the sequential steps for setting end portions of the bundle in an artificial kidney, according to a fourth embodiment of this invention.

Next, a fourth embodiment of this invention will be described with reference to FIGS. 11 and 12, which will be applied to an artificial kidney apparatus.

This embodiment is different from the third embodiment of FIG. 10 only in construction of the molding cavity 51.

In the molding cavity 51 according to the fourth embodiment, the first and second molding cavities 52 and 53 are vertically combined with each other. Accordingly, it is more easy to form the molding cavity 51. However, the piston rod 58 should be operated from below the molding cavity 51. In this embodiment, the pressure of the piston disc 57 may be transmitted to the solidifiable liquid through a heavier third liquid than the solidifiable liquid, such as glycerine which is previously contained in the lower cavity 51, where these two liquids are not mixed because of their differences in specific weight. This process effects saving the amount of the costly solidifiable liquid.

Figure 13:
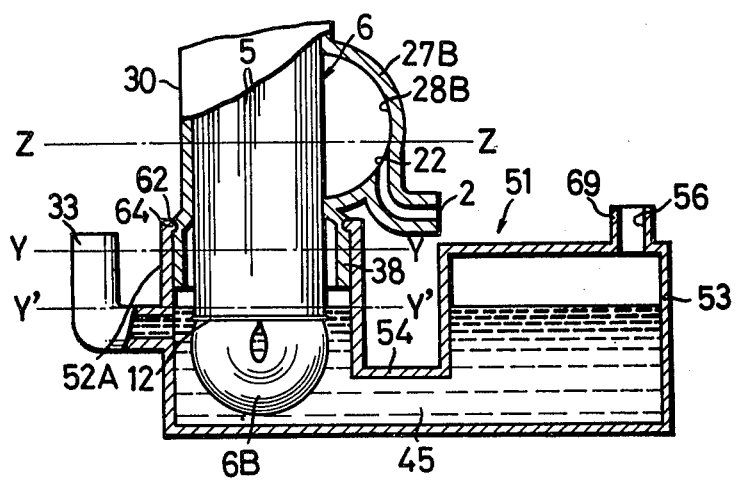
FIG. 13 is a partly broken away front view illustrating one of the sequential steps for setting end portions of the bundle in a casing assembly for an artificial kidney, according to a fifth embodiment of this invention.

Next, a fifth embodiment of this invention will be described with reference to FIG. 13, which will be applied to an artificial kidney apparatus. This embodiment is different from the third embodiment of FIG. 10 only in construction of the molding cavity 51.

In the molding cavity 51 according to the fifth embodiment, the solidifiable liquid is not pressed by the piston rod 58 and the piston disc 57, but it is pressed by a compressed gas such as a compressed air or a compressed nitrogen gas introduced into the second cavity 53. An opening 56 is made at an eccentric position in the upper wall of the second cavity 53. The opening 56 needs not locate at a central position. A tube 69 for supplying and discharging the compressed gas is connected to the opening 56 of the second cavity 53.

Next, a sixth embodiment of this invention will be described with reference to FIG. 14, which is also applied to an artificial kidney apparatus.

In this embodiment, there are not the enlarged cross-section portions 27A and 27D in contrast to the first embodiment. The one enlarged cross-section portion 27B is formed in the lower end portion of the one side 29 of the casing assembly 1. The other enlarged cross section portion 27C is formed in the upper end portion of the other side 30 of the casing assembly 1. In order to prevent the wicking of the solidifiable liquid 45, polar gas is introduced into the assembled housing 1 instead of the second liquid of the first embodiment. A single gas or a mixture selected from ammonia gas, primary amine gas and secondary amine gas is used as the polar gas. The polar gas 76 is supplied into the permeating region 25 through the outlet tube 3 for dialysate and is discharged through the inlet tube 2 for dialysate. The lower end portion 6B of the bundle 6 is dipped into the solidifiable liquid 45, while the polar gas 76 flows through the housing 1. Or after the permeating region 25 is filled with the polar gas 76, and the outlet tube 3 and the inlet tube 2 are plugged, the lower end portion 6B of the bundle 6 may be dipped into the solidifiable liquid 45. Or after the bundle 6 is subjected to be in contact with the polar gas 76 for some time, and the polar gas is purged out by blowing air through the inlet and outlet tubes 2 and 3, from the permeating region 25, the lower end portion 6B of the bundle 6 may be dipped into the solidifiable liquid 45. Or at the same time when, or immediately after the lower end portion 6B of the bundle 6 is dipped into the solidifiable liquid 45, the polar gas 76 may be introduced into the housing 1. In this embodiment, the lower end portion 6B of the bundle 6 is dipped into the deaerated polyurethane composition comprising prepolymer and curing agent with the introduction of the polar gas into the housing 1.

The method in this invention for setting or fixing the bundle in the fluid-tight casting wall members and engaging the interior portion of the casing assembly, can operate very simply and easily. And surprisingly, the wicking of the solidifiable liquid due to capillarity or capillary action can be effectively prevented by the introduction of the polar gas according to this invention into the permeating region 25 of the housing 1.

The polar gas according to this invention is ammonia gas, primary amine gas such as methyl amine gas, ethyl amine gas, or vaporized aniline, and secondary amine gas such as dimethyl amine gas, diethyl amine gas or methyl aniline vapor. One or more of the above-described gases may be used.

In the above described embodiments of this invention, the bundle inserted in the right position in the casing assembly 1 is directly potted fluid-tightly in the casing assembly 1. However, alternatively, the end portions of the bundle of hollow fibers can be set without using the casing assembly, according to this invention, the bundle whose both end portions are set fluid-tightly with the potting material can then be inserted into the casing assembly 1, and then it can be potted to the casing assembly 1.

The end portion of the bundle may be dipped into the solidifiable liquid in such a condition that all the surfaces of the hollow fibers of the bundle are in contact with the polar gas introduced. Or the polar gas may be introduced into the bundle in the permeating region while the level of the solidifiable liquid is being moved upward or while the bundle is being moved downward to dip its end portion into the solidifiable liquid.

The reasons why the wicking of the solidifiable liquid due to capillarity can be prevented by the use of the above described gas, seem to be the following facts:

First, all of the above-described gases have considerable polarity, and they are liable to be adsorbed and condense onto the surfaces of the hollow fibers to form thin films, for example, to form monomolecular films on the surfaces of the hollow fibers. The condensed film will change the surface free energy $\gamma s$ of the hollow fibers, which results in the change of the work $W_i$ of wetting according to the formula (1). This might bring the prevention of the wicking.

Second, when the above-described polar gas and the solidifiable liquid are contacted with each other, the free energy $\gamma 1$ between the polar gas and the surface of the solidifiable liquid must be changed. As indicated by the formulas (2) and (3), the work $W_i$ of wetting varies with the free energy $\gamma 1$. As the result, the wicking is suppressed.

When polyurethane composition is used as the solidifiable liquid, the gaseous material such as ammonia gas reacts with the isocyanate groups in prepolymer to form a three-dimensional cross-linking on the surface of the solidifiable liquid which would serve to suppress the wicking of the solidifiable liquid.

A further reason why the polar gas according to this invention can effect prevening the wicking may be due to the fact that the membranes of the hollow fibers cannot be in a perfect dried condition, but more or less water is adsorbed onto the membrane surfaces and the water retaining on the surfaces promotes the adsorption of the polar gas onto the surfaces of the hollow fibers, and that the higher the polarity of the gas, the greater the change of the free energy of the boundary surface between the polar gas and the solidifiable liquid.

The advantages of the above-described embodiment according to this invention are as follows:

I. The gaseous material used for the prevention of the wicking can be easily and uniformly distributed into the whole parts of the bundle. The wicking can be perfectly prevented even in the central portion of the bundle.

II. In order to prevent the wicking, the gaseous material is merely introduced into the housing. The operation is very simple and easy.

III. After the end portion of the bundle is potted with the solidifiable liquid, the used gaseous material can be easily expelled from the housing.

IV. The gaseous material to prevent the wicking has no bad influence on solidification of the solidifiable liquid for the potting of the bundle. A very small amount of the gaseous material is merely adsorbed onto the surfaces of the hollow fibers. Therefore, this does not exert a bad influence on the solidification reaction, so as to keep a good adhesion property between the hollow fibers and the solidified resin. Accordingly, the cast wall member obtained is fluid-tight and shows no leakage during permeability operation.

This invention can be applied not only to the bundle of hollow fibers, but also to any bundle of thread-like bodies. However, this invention is particularly useful for the prevention of the wicking through the bundel of hollow fibers which is used in a permeability apparatus such as the blood dialysis apparatus as above described.

The hollow fibers are formed of, for example, cellulose derivative such as cellulose acetate or cellulose butylate, cellulose, polymethylmethacrylate, polymethylacrylate, or acrylonitrile copolymer.

Next, examples for the embodiment according to this invention will be described.

EXAMPLE 1

A hank of hollow fiber of cellulose, made by looping the hollow fiber of cellulose by 8000/2 turns, namely a hank of hollow fiber of cellulose having eight thousands of hollow fibers on its cross section was placed in the permeating region 25 of the housing 1 in the apparatus shown in FIG. 16. The outer diameter of the hollow fibers was 260μ.

Polyurethane composition, namely a mixed liquid of Sumijule PF and Desmofen DD 1607 (both phonetically spelled, Japanese trade names) was slowly supplied or pressed into the molding cavity 51 through the inlet tube 33. At the time when the level of the solidifiable polyurethane composition reached the line Y — Y, ammonia gas was introduced into the housing 1 through the outlet tube 3 for dialysate, and was discharged out from the housing 1 through the inlet tube 2.

As the result of this processing, the level of the polyurethane composition was fixed at the line Y — Y, and the polyurethane composition was not drawn up along through the bundle 6 above the line Y — Y. Undesirable capillarity did not occur.

For comparison, in the instance that the ammonia gas was not introduced after the level of the polyurethane composition reached the line Y — Y, the polyurethane composition was drawn up along through the bundle 6 beyond the line Z — Z. The permeating portion of the bundle 6 was contaminated and coated with the polyurethane resin liquid. Such contamination reduced the dialysis efficiency of the apparatus.

EXAMPLE 2

The same apparatus (FIG. 14) as in the example 1 was used. The same bundle 6 as in the example 1 was inserted through the permeating region 25 of the housing 1. Before the polyurethane composition was supplied into the molding cavity 51, the ammonia gas was introduced into the permeating region 25 through the outlet tube 3 for dialysate, while the inlet tube 2 for dialysate was plugged. And after the apparatus was allowed to stand for some time, the ammonia gas was purged from the housing 1. Then, the polyurethane composition was slowly supplied into the molding cavity 51 until the level of the composition reached the line Y — Y. Then it was allowed to stand until it was solidified.

Since the bundle 6 was previously processed with the ammonia gas, the undesirable wicking hardly occured. The polyurethane composition was solidified at the level Y — Y to form a cast wall member for each end of the case assembly without any appreciable wicking.

EXAMPLE 3

The same apparatus (FIG. 14) as in the example 1 was used. A hank of hollow fiber of polymethylmethacrylate was closely bunched in the form of loop by 10000/2 turns, thus a hank of hollow fiber comprising ten thousands of hollow fibers on its cross section was inserted into the permeating region 25 of the housing 1. The outer diameter of the hollow fibers was 300μ.

While methylamine gas was supplied into the permeating region 25 through the outlet tube 3 for dialysate and was discharged from the inlet tube 2. The polyurethane composition was introduced into the molding cavity 51 through the inlet tube 33 to dip the lower end portion 6B of the bundle 6, until the level of the polyurethane composition reached the line Y — Y. The undesirable wicking scarcely occured. The liquid polyurethane composition was not drawn up beyond the level Y — Y.

For comparison, the polyurethane composition was introduced into the molding cavity 51 through the inlet tube 33 without supplying the methylamine gas into the permeating region 25. In that case, the wicking remarkably occured. The polyurethane composition was drawn up along through the bundle 6 beyond the level Z — Z before its solidification.

EXAMPLE 4

An experiment was made, using the same apparatus (FIG. 14) as in the example 3. Silicone (resin) composition (RTV 3402, manufactured by Tokyo Shibaura Electric Co., Ltd., the Japanese Company) was used as the solidifiable liquid. The hollow fiber used was made of polymethylacrylate. While the methylamine gas was supplied into the permeating region 25 of the housing 1, the silicone composition was introduced into the molding cavity 51 to dip the lower end portion 6B of the bundle 6. The wicking did not occur at all. However, when the bundle 6 was not processed with the methylamine gas, the wicking occured remarkably beyond the level Z — Z. Thus, a considerable part of the permeating portion of the bundle 6 was coated with the silicone resin, which results in considerable reduction of permeability.

EXAMPLE 5

The same apparatus (FIG. 14) as in the above described examples was used. And the same bundle of hollow fibers as in the example 1 was used.

While the ammonia gas was flowed through the permeating region 25 of the housing 1 from the outlet tube 3 to the inlet tube 2 for dialysate, the silicone composition (Silastic-trade name-manufactured by Dow Chemical Company) was supplied into the molding cavity 51 through the inlet tube 33 to dip the lower end portion 6B of the bundle 6, until the level of the silicon composition reached the line Y — Y in the housing 1. The apparatus was allowed to stand for some time until the resin was solidified. By introducing the ammonia gas into the permeating region 25, the wicking did not occur, and the upper level of the solidified silicone resin was kept at the line Y — Y.

For comparison, without introducing the ammonia gas into the permeating region 25, the silicone composition was supplied into the molding cavity 51. The wicking occured due to capillarity, so that the silicone composition was drawn up along through the bundle 6 beyond the level Z — Z.

EXAMPLE 6

The same experiment as in the example 1 was made except that a hank of hollow fiber of polyacrylonitrile (8000/2 turns) was used and epoxy resin composition (Cemedine 1500-trade name-manufactured by Cemedine Company) was used as the solidifiable liquid.

In this example, the wicking did not occur at all. However, a control experiment without using the ammonia gas showed tremendous wicking.

EXAMPLE 7

A hank of hollow fiber of acrylonitrile-methallylsulfonic acid copolymer (97:3) in the form of loop (3000/2 turns), was used in this example. Ethylamine gas was flowed through the permeating region 25 of the housing 1, while the polyurethane composition used in the example 1 was supplied into the molding cavity 51.

The polyurethane composition was solidified at the level Y — Y in the housing 1. The wicking did not occur.

EXAMPLE 8

The same experiment as in the example 7 was made except that the silicone composition was used as the solidifiable liquid. Also in this example, it was found that the wicking of the silicone composition did not occur.

EXAMPLE 9

The same experiment as in the example 1 was made except that hollow fiber of cellulose acetate, and dimethylamine gas were used. In this example, the wicking did not occur at all.

EXAMPLE 10

The same experiment as in the example 3 was made except that diethylamine gas of temperature 45° C was flowed through the permeating region 25 of the housing 1. In this exaple, the very little wicking occured.

While the invention has been particularly shown and described with reference to preferred embodiments thereof, it will be understood by those skilled in the art that various changes in form and details may be made therein without departing from the spirit and scope of the invention.

In the above embodiments, the solidifiable liquid 45 is solidified, while the bundle 6 is dipped into the second liquid between the predetermined level Z — Z and the level Y — Y of the solidifiable liquid 45. However, the bundle 6 needs not always be dipped into the second liquid. For example, the predetermined portions of the hollow fibers may be coated with the second liquid by a brush, before the lower end portion of the bundle is dipped into the solidifiable liquid. Or the predetermined portions of the hollow fibers may be dipped into the second liquid 46 and then may be taken out from the second liquid. In that case, the lower end portion of the bundle should be dipped into the solidifiable liquid 45, and be solidified before the bundle 6 wetted with the second liquid 46 is dried up. In this case, the second liquid 46 had better have a higher boiling point. Alternatively, until the solidifiable liquid is solidified, the predetermined portions of the hollow fibers may be intermittently coated with the second liquid by a brush or the second liquid may be intermittently supplied into the bundle 6 by a suitable syringe, for example.

The method for supplying the polar gas into the bundle may be varied.

What is claimed is:

1. A method for setting an end portion of a bundle of thread-like bodies so that capillary action is reduced between said bodies, comprising the steps of:
    A. dipping an end portion of a bundle of threadlike bodies into a solidifiable liquid, said bodies being so disposed that capillaries exist between said bodies;
    B. contacting at least that part of said bundle which is immediately adjacent said end portion with a second liquid more wettable to said bundle and lighter than said solidifiable liquid; said contacting step occuring prior to exposure of that adjacent part to said solidifiable liquid whereby said second liquid acts to prevent said capillary action; and
    C. permitting said solidifiable liquid to solidify.

2. A method for setting an end portion of a bundle of thread-like bodies according to claim 1, further comprising the steps of:
    A. setting said bundle with said solidifiable liquid, contacting at least a part of said bundle, adjacent to the predetermined level of said solidifiable liquid with said second liquid;
    B. placing said bundle in a upright position within said casing assembly; and
    C. fixing in fluid-tight relationship an end portion of said set bundle to said casing assembly.

3. A method for setting an end portion of a bundle of thread-like bodies according to claim 1, in which silicone resin composition is used as said solidifiable liquid, and said second liquid is selected from the group consisting of water, methanol, ethanol, acetic acid, ethylene glycol, glycerine, calcium chloride, sodium chloride, and potassium chloride, and their aqueous solutions, cyclohexanol, isopropanol, vegetable oil, animal oil and fatty acid (carbon number: 1 to 22).

4. A method for setting an end portion of a bundle of thread-like bodies according to claim 1, in which epoxy resin composition is used as said solidifiable liquid, and said second liquid is selected from the group consisting of water, methanol, ethanol, acetic acid, ethylene glycol, glycerine, calcium chloride, sodium chloride and potassium chloride, ethylene glycol, and their aqueous solutions, cyclohexane, heptane and octane.

5. A method for setting an end portion of a bundle of thread-like bodies according to claim 1, in which polyurethane composition is used as said solidifiable liquid, and said second liquid is selected from the group consisting of water, methanol, ethanol, acetic acid, ethylene glycol, glycerine, calcium chloride, sodium chloride and potassium chloride, dioxane, ethylene glycol, and their aqueous solutions, and dioctylphtalate.

6. A method for setting an end portion of a bundle of thread-like bodies according to claim 1, in which water containing plasticizer is used as said second liquid.

7. A method for setting an end portion of a bundle of thread-like bodies according to claim 1, in which saturated or almost saturated aqueous inorganic salt solution containing plasticizer is used as said second liquid.

8. The method for setting an end portion of a bundle of thread-like bodies in a casing so that capillary action is reduced between said bodies, comprising the steps of:
    (A) dipping an end portion of a bundle of threadlike bodies into a solidifiable liquid, said bodies being so disposed that capillaries exist between said bodies;
    (B) placing said bundle in a casing assembly;

(C) contacting at least that part of said bundle which is immediately adjacent said end portion with a second liquid which is lighter and more wettable to said bundle than said solidifiable liquid; said contacting step occuring prior to exposure of that adjacent part to said solidifiable liquid whereby said second liquid acts to prevent said capillary action; and (D) permitting said solidifiable liquid to solidify and bond said bundle to said casing assembly.

9. A method for setting an end portion of a bundle of thread-like bodies according to claim 8 in which a compressed gas is introduced into said casing assembly at the same time or in a short time after when said end portion of said bundle is dipped into said solidifiable liquid.

10. A method for setting an end portion of a bundle of thread-like bodies according to claim 8, in which said casing assembly is vertically arranged, said solidifiable liquid is introduced into a molding cavity attached to a lower end portion of said casing assembly to dip the lower end portion of said bundle into said solidifiable liquid, while the upper end portion of said bundle is held to keep said bundle at the right position in said casing assembly, said solidifiable liquid is solidified to form a fluid-tight cast wall member surrounding said thread-like bodies and engaging said casing assembly, and then the lower end portion of said cast wall member and said lower end portion of said bundle of said thread-like bodies extending through said cast wall member are severed.

* * * * *